(12) United States Patent
Setzer, Sr. et al.

(10) Patent No.: US 8,708,349 B1
(45) Date of Patent: Apr. 29, 2014

(54) PORTABLE TRANSFER APPARATUS FOR MOVING ITEMS

(76) Inventors: Mitchell Olin Setzer, Sr., Lenoir, NC (US); Larry Richard Setzer, Sr., Lenoir, NC (US)

(*) Notice: Subject to any disclaimer, the term of this patent is extended or adjusted under 35 U.S.C. 154(b) by 47 days.

(21) Appl. No.: 13/556,155

(22) Filed: Jul. 23, 2012

Related U.S. Application Data

(60) Continuation-in-part of application No. 13/023,114, filed on Feb. 8, 2011, now Pat. No. 8,579,304, which is a continuation-in-part of application No. 12/964,200, filed on Dec. 9, 2010, now abandoned, which is a continuation-in-part of application No. 12/485,880, filed on Jun. 16, 2009, now Pat. No. 7,870,629, which is a division of application No. 12/046,886, filed on Mar. 12, 2008, now Pat. No. 7,914,017, application No. 13/556,155, which is a continuation-in-part of application No. 12/705,963, filed on Feb. 15, 2010, now abandoned.

(60) Provisional application No. 61/510,162, filed on Jul. 21, 2011, provisional application No. 61/061,729, filed on Jun. 16, 2008, provisional application No. 60/894,242, filed on Mar. 12, 2007.

(51) Int. Cl.
*B62B 3/04* (2006.01)
(52) U.S. Cl.
USPC .......................................... 280/35; 414/730
(58) Field of Classification Search
USPC ............... 280/638, 35, 47.27, 47.28, 47.29, 280/47.34, 79.11; 414/751.1, 753.1, 749.6, 414/730, 732, 733; 56/328.1, 332, 333
See application file for complete search history.

(56) References Cited

U.S. PATENT DOCUMENTS

| | | | |
|---|---|---|---|
| 3,716,147 A | | 2/1973 | Pipes |
| 4,208,860 A | * | 6/1980 | Edwards ................. 56/328.1 |
| 4,274,802 A | * | 6/1981 | Inaba et al. ................ 414/783 |
| 4,663,925 A | * | 5/1987 | Terada ..................... 56/328.1 |
| 4,975,016 A | | 12/1990 | Pellenc et al. |
| 5,338,015 A | * | 8/1994 | Liegel et al. .................. 269/71 |
| 5,426,927 A | * | 6/1995 | Wang et al. .............. 56/328.1 |
| 5,555,953 A | | 9/1996 | Henderson |
| D565,270 S | | 3/2008 | Ruppert et al. |

\* cited by examiner

*Primary Examiner* — John Walters
(74) *Attorney, Agent, or Firm* — Monty Simmons; Simmons Patents

(57) ABSTRACT

The disclosed technology is a configurable column tool configured for moving items from a first elevation to a second elevation such as moving an item from a pallet to a shelf. The configurable column tool is further associated with a transporter, such as a rider lift, said transporter configured to transport a transport-device, such as pallet, from one location to another and perhaps raise/lower such transport-device for stacking. The configurable column tool is mechanically associated with the transporter so that the transporter can move the configurable column tool from a first location to a second location and perhaps raise/lower the configurable column tool. The configurable column tool is configured with one of a plurality of tool attachments, one such attachment being clamping device.

17 Claims, 15 Drawing Sheets

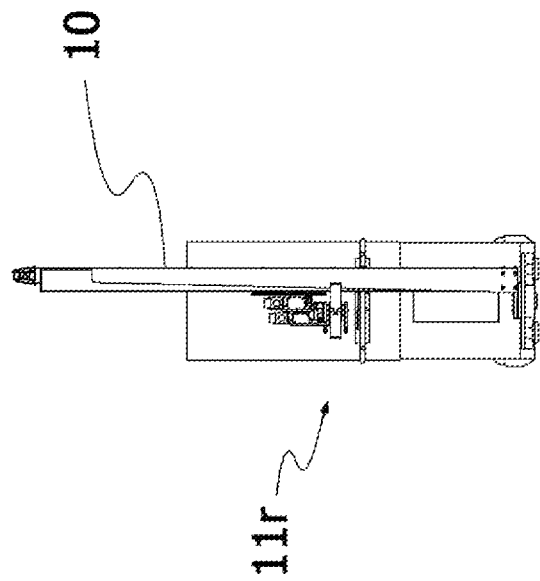
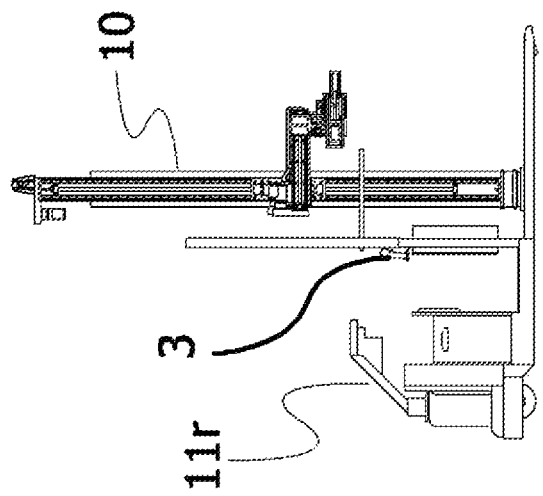

Beam Assembly Column

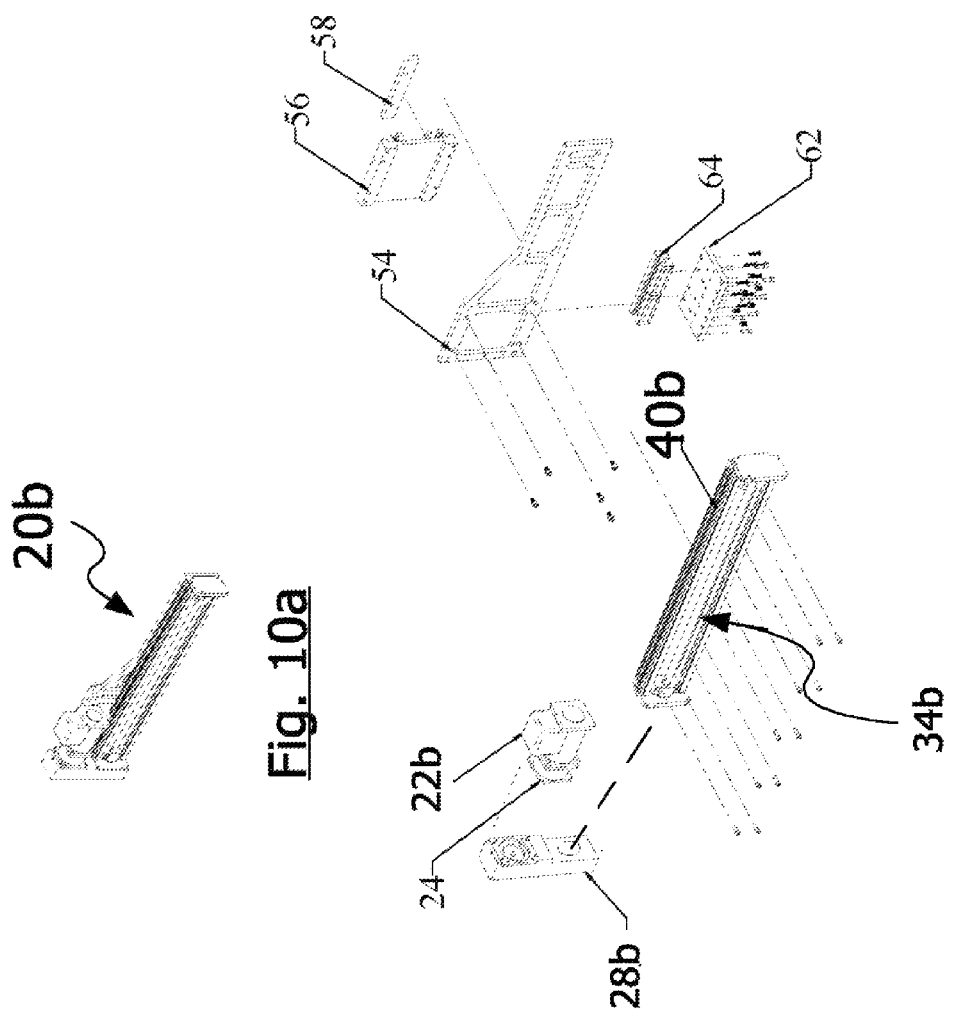

PORTABLE TRANSFER APPARATUS FOR MOVING ITEMS

CLAIM TO PRIORITY

This application claims priority to provisional application 61/510,162 filed on Jul. 21, 2011 and is further a continuation in part to application Ser. No. 13/023,114, field on Feb. 8, 2011 now U.S. Pat. No. 8,579,304, which is a continuation in part to application Ser. No. 12/964,200, filed Dec. 9, 2010 now abandoned, which a continuation in part to application Ser. No. 12/485,880, filed on Jun. 16, 2009 (now U.S. Pat. No. 7,870,629) which claims priority to provisional application 61/061,729, filed on Jun. 16, 2008, which is a division of Ser. No. 12/046,886, filed on Mar. 12, 2008 (now U.S. Pat. No. 7,914,017) and claims priority from provisional application 60/894,242 filed Mar. 12, 2007, and is further a continuation in part to application Ser. No. 12/705,963, filed on Feb. 15, 2010 now abandoned, the entire contents of which are hereby incorporated by this reference for all that they disclose for all purposes.

TECHNICAL FIELD OF THE INVENTION

The present invention relates to a portable transfer apparatus and method for transferring an item from a first location to a second location. For one embodiment, the apparatus is associated with a transporter configured for moving the transfer apparatus as well as items to be transferred.

BACKGROUND OF THE INVENTION

A wide range of industrial lifting equipment and products are available for transferring items in a warehouse or manufacturing environment. Such lifting equipment includes vertical lifts, scissor lifts, stackers, pallet jacks, pallet trucks, cranes, forklifts, and telescopic lifts. Such devices may be powered or unpowered and may be used to transfer items from a first location to a second location. Devices where the operator "walks" while operating the device are typically referred to as a "Walkie" whereas devices that are ridden while being operated are typically referred to as a "rider." Such devices can have many names. Forklifts, for example, are also known as lift trucks, stacker trucks, trailer loader, side loaders, fork truck, tow motor, and fork hoist. A list of common lift truck types include: hand pallet trucks, walkie low lift trucks (powered pallet truck, usually electrically powered), Rider low lift truck, towing tractor, walkie stacker, rider stacker, reach truck (small forklift, designed for small aisles, usually electrically powered, so-named because the forks can extend to reach the load), electric counterbalanced truck, IC counterbalanced truck, sideloader, telescopic handler, walkie Order Picking truck, rider order picking truck (commonly called an "Order Picker"; like a small forklift, except the operator rides up to the load and transfers items article by article; i.e. operator is lifted to elevated racks where he "picks" items to fill a customer "order"), Articulated Very Narrow Aisle Counterbalanced trucks (commonly called "Flexi or Bendi Truck"), Guided Very Narrow Aisle truck— 'Man Down' (a type of reach truck designed for aisles less than five feet wide) and 'Man Riser' Combination Pickle Picker/Stacker truck, and Truck Mounted Forklift/Sod Loader.

All the above devices represent the group of powered and unpowered industrial devices used to lift and transport materials. One type of machine of particular interest in this document is often referred to as a stacker. Prior art stackers are typically a manually maneuvered device that is used to raise or lower a product to a specific elevation. The vertical action can be either powered or manual. Stackers are generally configured to interface with a pallet supporting goods in a stable fashion while being stored. Restated, a pallet (sometimes called a skid) is a flat transport structure that supports items/goods in a stable fashion while being lifted by devices including stackers, forklifts, pallet jacks, and front loaders.

Pallets are often stacked on top of one another and form the structural foundation of a unit load which provides handling and storage efficiencies. Goods or shipping containers are often placed on a pallet secured with strapping, stretch wrap or shrink wrap and shipped. A stacker is typically configured to transfer a pallet form one location to another as well as stack pallets on top of one another.

Such devices work well for their intended purposes, however, there are functions that none do well, if at all. One such function relates to transferring individual items from a pallet. Prior art stackers are not configured to remove one item from a plurality of items being stored on the pallet. Restated, none of the above devices provide the capability of interfacing with a pallet (or similar storage device) storing a plurality of items and transferring the pallet containing said plurality of items to a new location, if necessary, and then selectively transferring one of said plurality of items from the pallet to a new location off the pallet.

For example, suppose a pallet is being used to store thirty 50 lb boxes and an operator wishes to move such pallet from its current location to a new work location and then remove one box from the pallet and transfer it to a new, off pallet, location. Prior art devices may be used to move the pallet to a new location but they do not have the capability of removing an individual 50 lb box from the pallet and transferring it to the new location off the pallet. Thus, the operator must be capable of manually picking up and moving the 50 pound box. Indeed, a plurality of workers may be required to move an individual item, depending on the weight of the item and the strength of the workers, putting such workers at higher risk of injury.

Various attributes of the invention disclosed herein addresses such shortcomings.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a selectively configurable and convertible column tool configured to provide anyone of a plurality of functions depending on the tool selected.

Yet another object of the invention is to provide a column tool configured for transferring an item from a first area to a second area. The items may be stacked in the first area and the tool is preferably configured to allow an operator to transfer at least one item from the plurality of items being stored, at said first area, and transfer such item to said second location. One example of said first area would include items being stored on a pallet and one example of said second area is a shelf. Consequently, the height of the tool may be remotely varied and further comprises a mechanical mechanism configured for being mechanically associated with at least one item.

Still another object of the invention is to provide a column tool configured for transferring an item from a first area to a second area where the column tool may be further associated with a transporter thereby making the column tool portable.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 1b presents a side plain view of the embodiment depicted in FIG. 1a;

FIG. 1c presents a front plain view of the embodiment depicted in FIG. 1a;

FIG. 9b presents an exploded side perspective view of the beam assembly column of FIG. 9a;

FIG. 10a presents a side perspective view of one exemplary embodiment of a bean assembly effector;

FIG. 10b presents an exploded size perspective view of the beam assembly effector depicted in FIG. 10a.

Figure 1A:
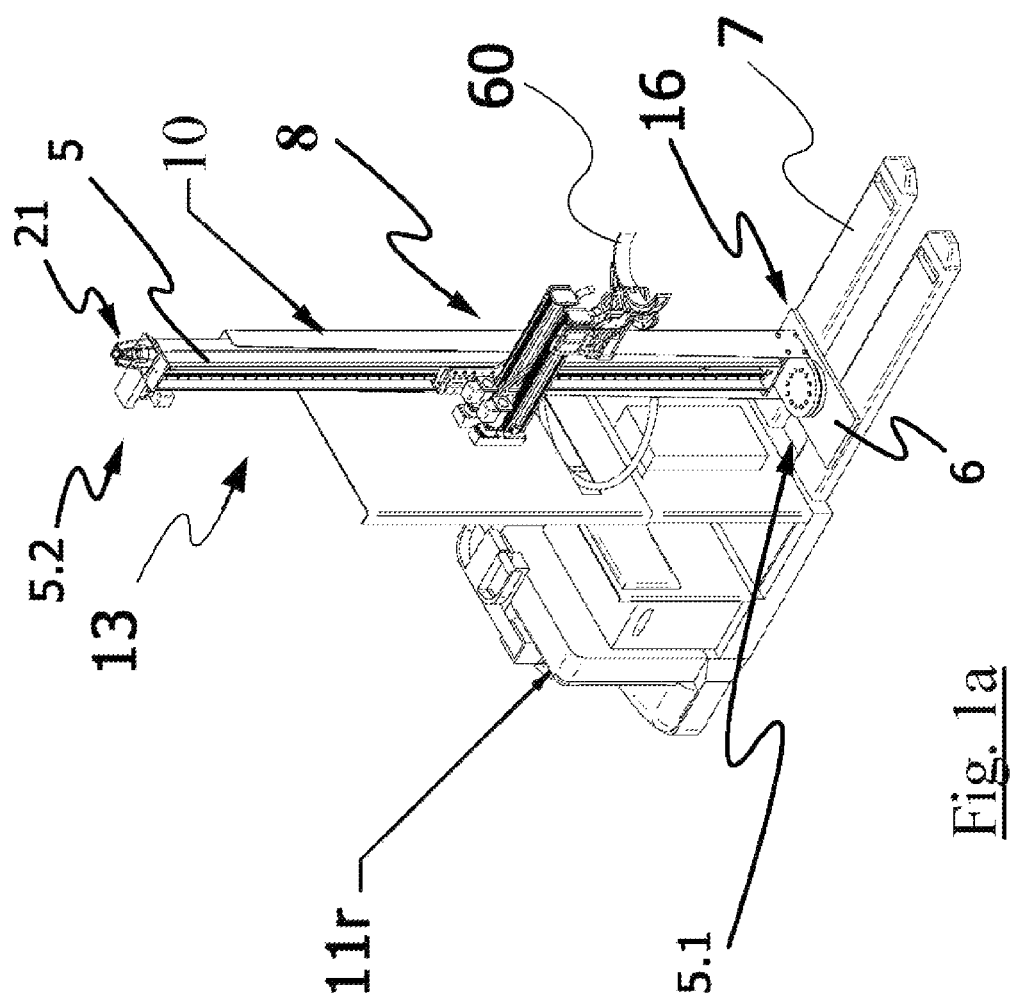
FIG. 1a presents one embodiment of the invention associated with a storage apparatus lift component of a rider transporter.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect, wireless, or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

While this section of the specification may contain headers, such headers are simply place markers and do not form a part of the specification and are not to be used in the construction of the specification.

While the particulars of the present invention and associated technology may be adapted for use with any type of device for transferring items, in any suitable environment, the examples discussed herein are primarily in the context of a configurable column tool comprising a position selectable telescoping clasping device associated with either walkie truck or a rider truck, configured with forks configured to lift and move a pallet storing a plurality of goods, and further configured to remove at least one item from said plurality of items and transferring such item to a second location.

Reference is now made to FIG. 1a, FIG. 1b, FIG. 1c, and FIG. 4. Referring to FIG. 1a, an elevated side perspective view of one exemplary embodiment of a configurable column tool, "CCT", (10) associated with a transporter (11r) is presented. FIG. 1b presents a side view of the apparatus depicted in FIG. 1a and FIG. 1c presents a front view of the apparatus depicted in FIG. 1a. The CCT (10) device comprises a column assembly (13) comprising a support column (5) defining a first end (5.1) and an opposing second end (5.2) wherein said first end defines a column interface (6) configured for being mechanically associated with a transporter interface (7) defined by a transporter (11r). The second end of support column (5) is mechanically associated with a column motion facilitator assembly (21) configured to activate a moving column interface (31; FIG. 6b) that moves along support column (5). As disclosed in more detail later, for one embodiment, column motion facilitator assembly (21) comprises a electric motor movably associated with a ball screw (34b; FIG. 6b) running the length of support column (5) wherein such ball screw is mechanically associated with moving column interface (31). The CCT (10) comprises at least one beam assembly (20) mechanically associated with the column motion facilitator (21) via moving column interface (31) wherein each of said at least one beam assemblies comprises a beam assembly effector (40) comprising a beam motion facilitator (described later). As depicted in FIG. 5, beam assembly (20a) is movably associated with support column (5) at the moving column interface (31) which is associated with column motion facilitator (21). Beam assembly (20a) further comprises a beam assembly effector (40a) which moveably associates beam assembly (20a) with second beam assembly (20b). Second beam assembly (20b) comprises beam assembly effector (40b) which movably associates second beam assembly (20b) with a tool (60). Notably, if there is only one beam assembly, such beam assembly is movably associated with tool (60). It should be noted that with this document the beam assembly effectors may be collectively referred to as beam assembly effectors (40) and the beam assemblies may be collectively referred to as beam assemblies (20).

The column motion facilitator (21), beam assembly effectors (40), and the tool (60) attachment are electrically association with a controller (3) disposed in a position easily accessible by a system user. There are many technologies that can be used as a controller (such as a joystick type hand controllers) and a detailed description thereof is not necessary to provide an enabling description of the invention. When the column motion facilitator (21) is activated by the controller (3), the moving column interface (31), associated with beam assembly (20), moves along the support column (5). Thus, for the current embodiment, the beam assemblies (20) move vertically up or down the support column (5). Similarly, controller (3) can activate beam effector (40a) to cause beam assembly (20b) to slide along beam assembly (20a) and beam effector (40b) to cause tool (60) to slide along beam assembly (20b). Further, the tool attachment is controlled by said controller (3). For clasping tools, the tool can be instructed to clasp an item or release an item.

For the currently preferred embodiment, CCT (10) is one exemplary embodiment of a position selectable telescopic clasping device. Such device is considered position selectable as the telescopic arm assembly (8) may move up and down column assembly (13). Additionally, the position of tool (60) is selectable.

Tool (60) may be any one of a plurality of tools/attachments such as forks, clamps, hooks, hoppers, rotator (for inverting containers), slab extraction clamps, and layer pickers. For the currently preferred embodiment, CCT (10) is considered a clasping device because the tool (60) is a device configured for clasping. Preferably, telescopic arm assembly (8) is configured with a telescopic arm interface suitably configured for receiving any one of a plurality of tool (60) devices configured to perform a plurality of functions.

Figure 1D:
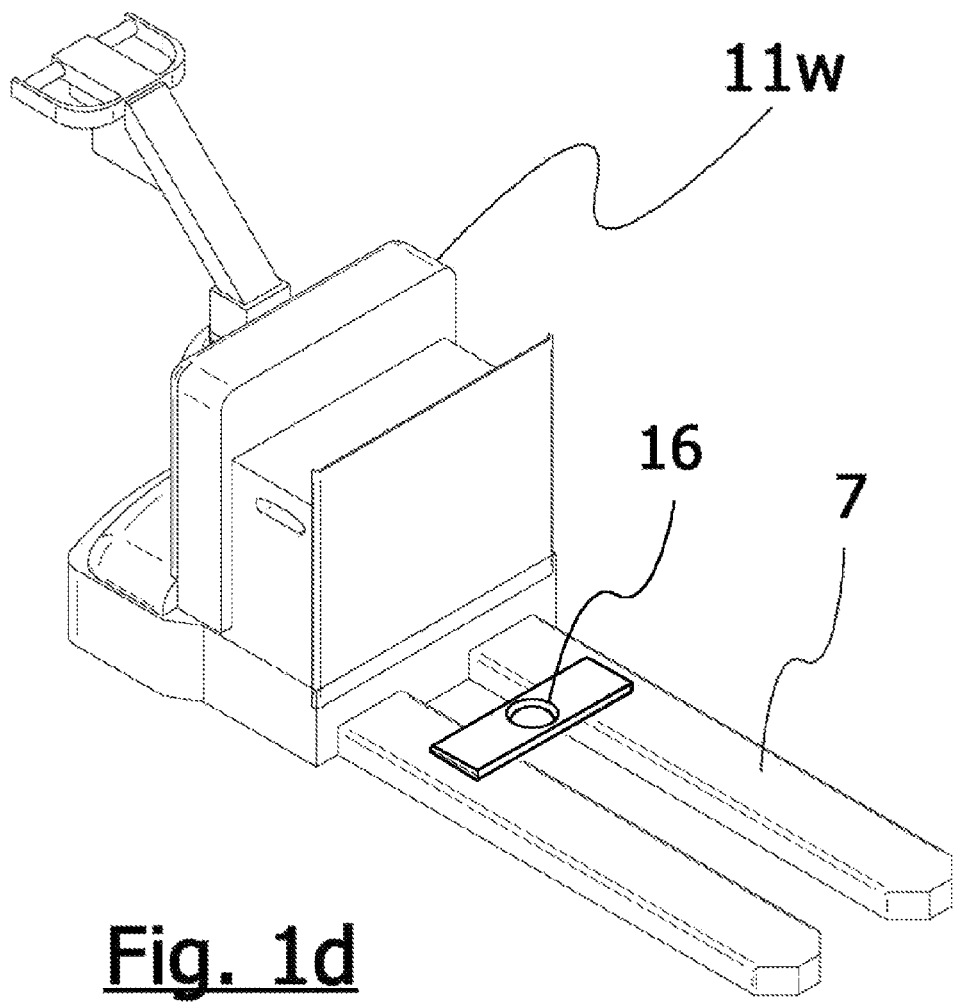
FIG. 1d presents an elevated side perspective view of one embodiment of a prior art walkie transport apparatus.
Figure 1E:
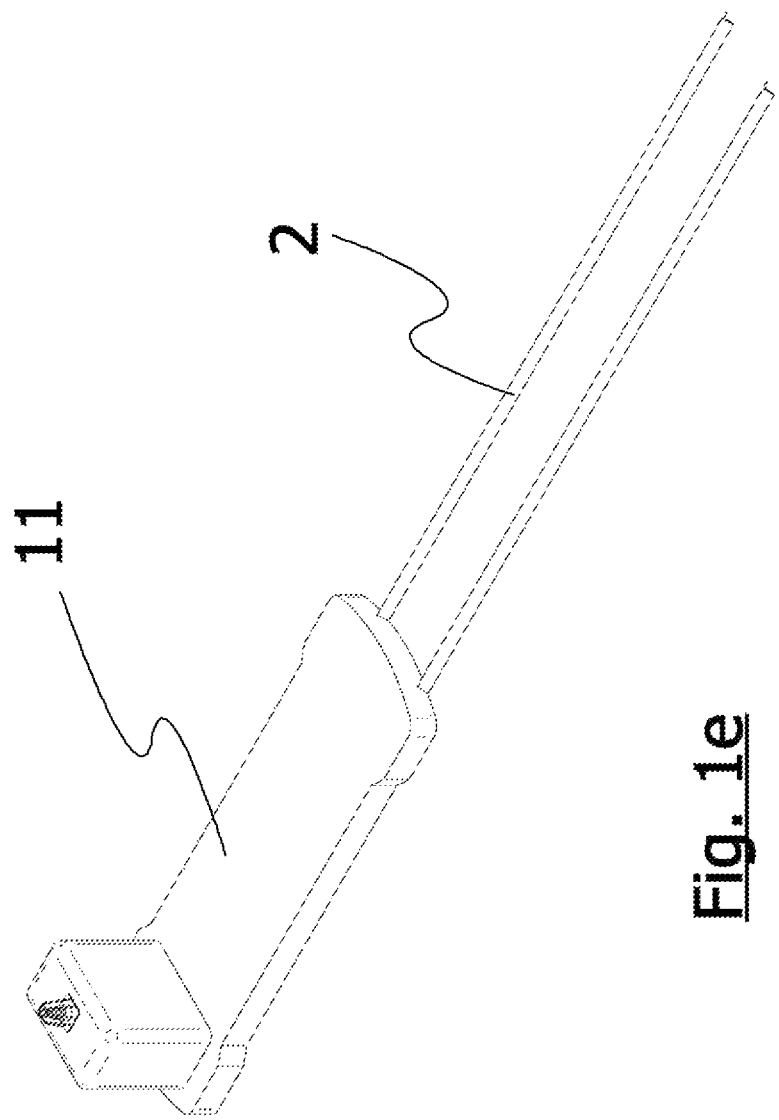
FIG. 1e presents an elevated side perspective view of one embodiment of a transport apparatus associated with and guided by rails.

As shown in FIG. 1a, transporter (11) comprises a rider stacker (11r). FIG. 1d presents one exemplary alternative embodiment of a transporter (11) comprising a walkie stacker (11w). Similarly, FIG. 1e presents another exemplary embodiment of a transporter (11) comprising either in manual or motorized device guided by rails. It should be further appreciated that any number of devices may be used as a transporter (11) without departing from the scope and spirit of the present invention including: vertical lifts, scissor lifts, stackers, pallet jacks, pallet trucks, cranes, forklifts, and telescopic lifts, forklifts, lift trucks, stacker trucks, trailer loaders, side loaders, fork trucks, tow motors, and fork hoist, walkie low lift trucks, rider low lift truck, towing tractor, walkie stacker, rider stacker, reach truck, electric counterbalanced truck, IC counterbalanced truck, telescopic handler, walkie order picking truck, rider order picking truck, articulated very narrow aisle counterbalanced trucks (commonly called "Flexi or Bendi Truck"), guided very narrow aisle truck (a type of reach truck designed for aisles less than five feet wide). Additionally, embodiments of the invention may be configured for operation in a stationary environment where a transporter is unnecessary.

As depicted in FIG. 1a, the CCT (10) comprises a base interface configured for being mechanically associated with the transporter interface (7) of a transporter (11r). For the current embodiment, transporter interface (7) is simply the interface-assembly of a transporter configured for begin associated with an item-storage-device (such as a pallet). Typically, an item-storage-device is configured for storing a plurality of items (although only one item may be stored) on a transportable platform so that such plurality of items may be stored and more easily transferred from one location to another as well as lifted or lowered to and from storage locations (such as on a shelf). For example, if the transporter (11) device is a typical fork lift comprising forks configured for being associated with a pallet storing at least one item, the transporter interface (7) will be defined by such forks.

Figure 2:
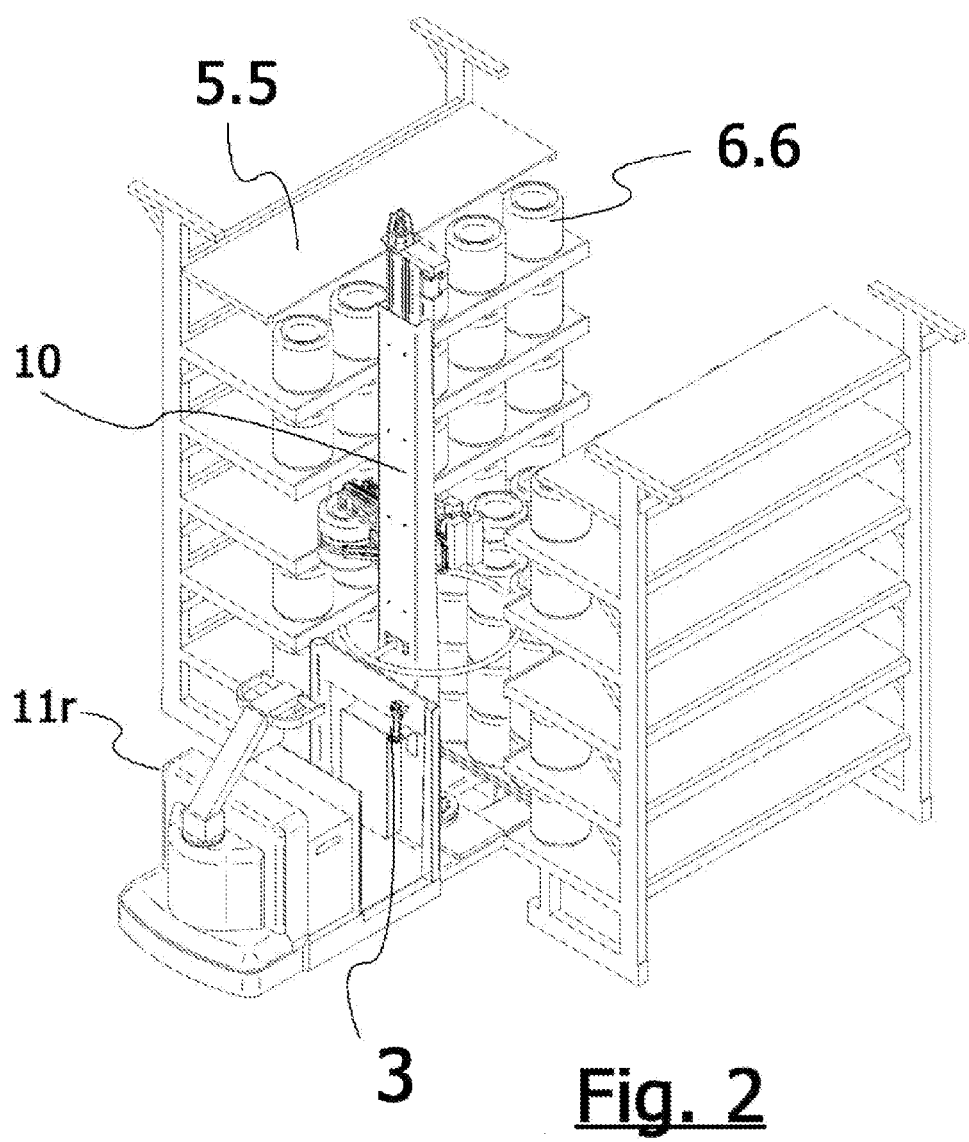
FIG. 2 presents an elevated perspective view of an item transfer device according to one embodiment of the invention shown between two storage racks supporting a plurality of items.
Figure 3:
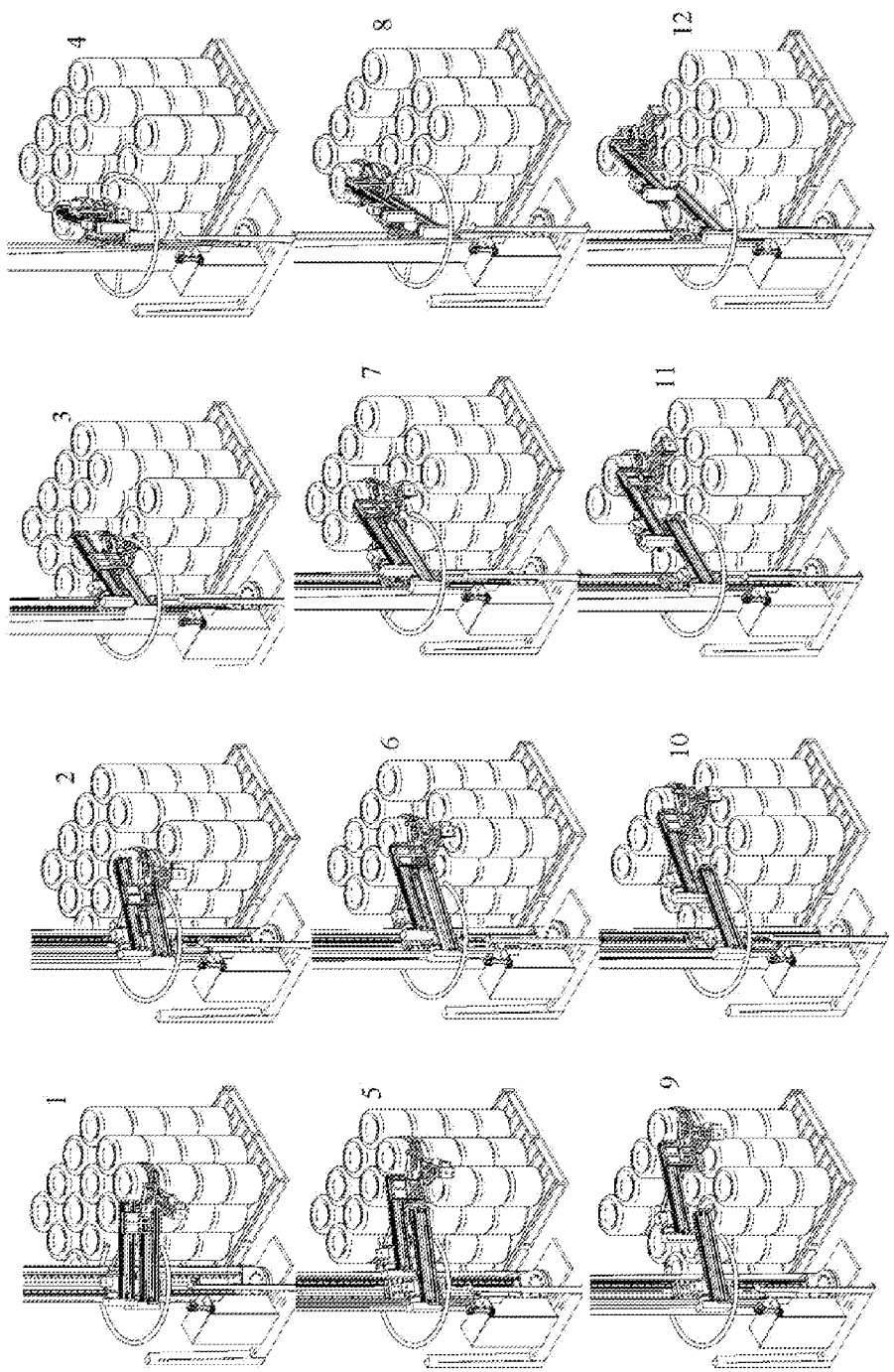
FIG. 3 presents one possible unloading sequence for a plurality of items being stored in a stacked configuration.

Referring now to FIG. 2, a side elevated perspective view of one embodiment of the invention is presented transferring an item from a pallet associated with transporter (11r). CCT (10) is shown grasping one cylindrical item (6.5) from a plurality of cylindrical items being stored on a pallet and transferring such item to an elevated shelf (5.5). Similarly, FIG. 3 shows an exemplary unloading sequence for a plurality of cylindrical items being stored in a stacked configuration. It should be noted that for this configuration, such items are not necessarily stored on a pallet. Notably, the height of CCT (10) is sufficient to allow an item to be transferred from a pallet without raising the pallet. That said, one of ordinary skill in the art will appreciate that even further heights can be achieved by raising the pallet using the transporter's listing mechanism (e.g. forks) and lifting the pallet and the column assembly (13).

Figure 4:
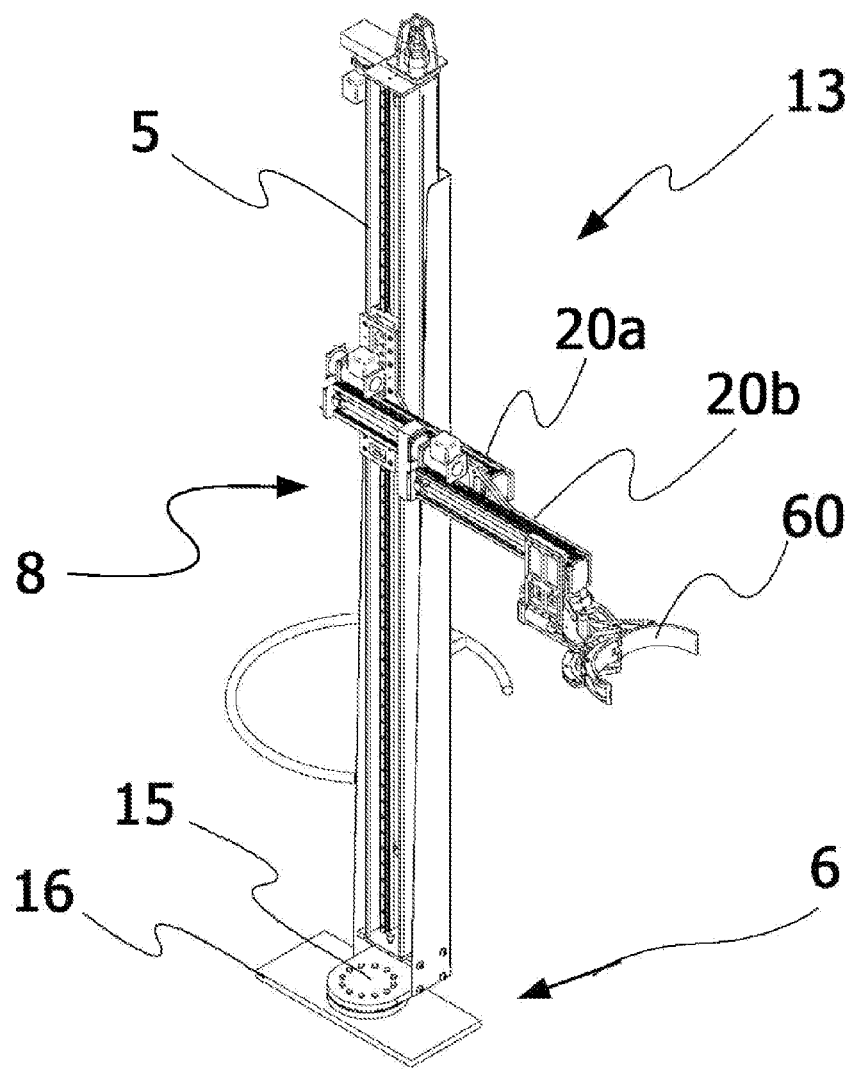
FIG. 4 presents a side perspective view of one exemplary embodiment of a column assembly.
Figure 5:
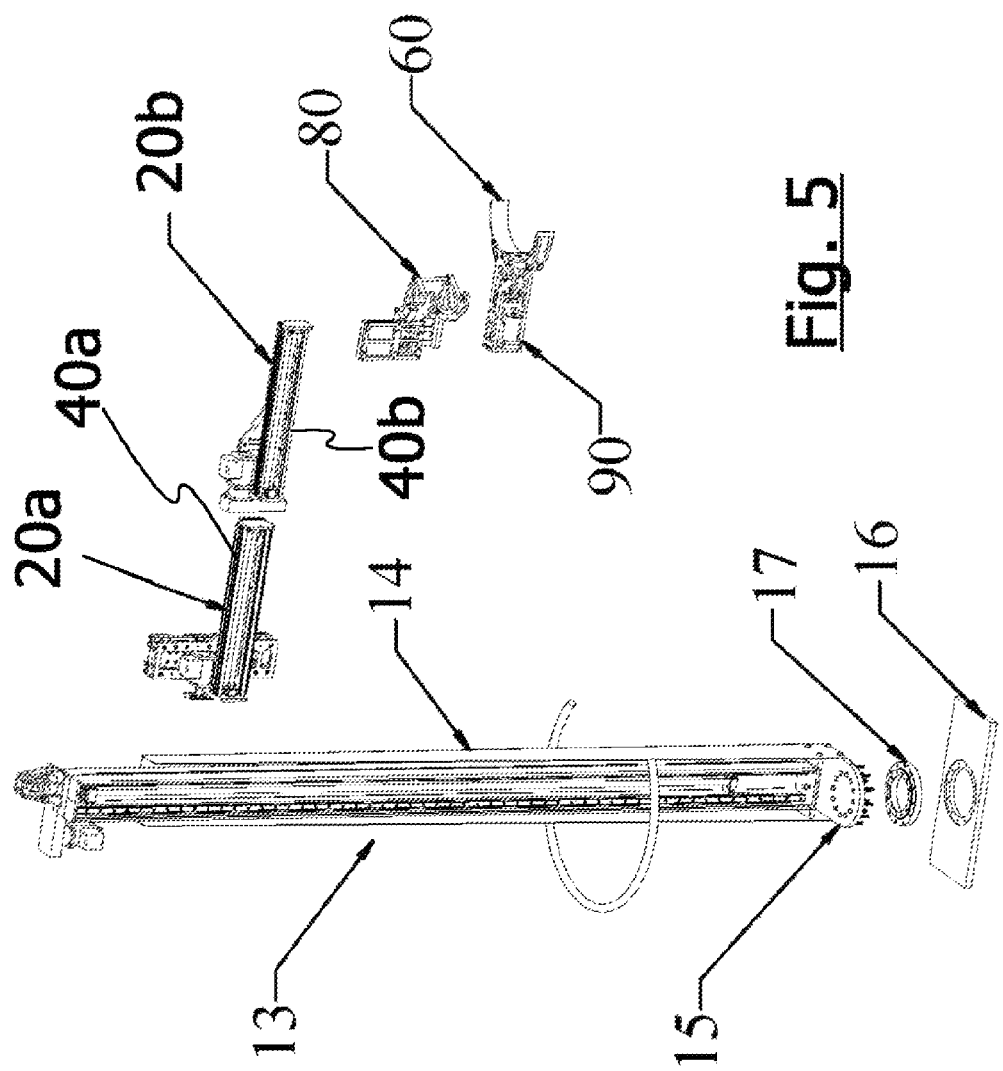
FIG. 5 presents an exploded view of major components of the item depicted in FIG. 4.

Referring now to FIG. 4 and FIG. 5, one exemplary embodiment of a column assembly (13) is presented. Such column assembly (13) comprises a vertically extending support column (5) defining a first end (5.1) and an opposing second end (5.2) wherein said first end (5.1) is configured for being associated with column interface (6). Column interface (6) is configured for being associated with the transporter interface (7) of transporter (11). Column assembly (13) further comprises a telescopic arm assembly (8) comprising a first beam assembly (20a) movably associated in a sliding or telescopic configuration with a second beam assembly (20b) via a beam assembly effector (40a). Second beam assembly (20b) comprises a beam assembly effector (40b) defining a tool interface configured for being associated with a column assembly tool device. As depicted in FIG. 4, such column assembly tool device is effector clamp (60).

Figure 6:
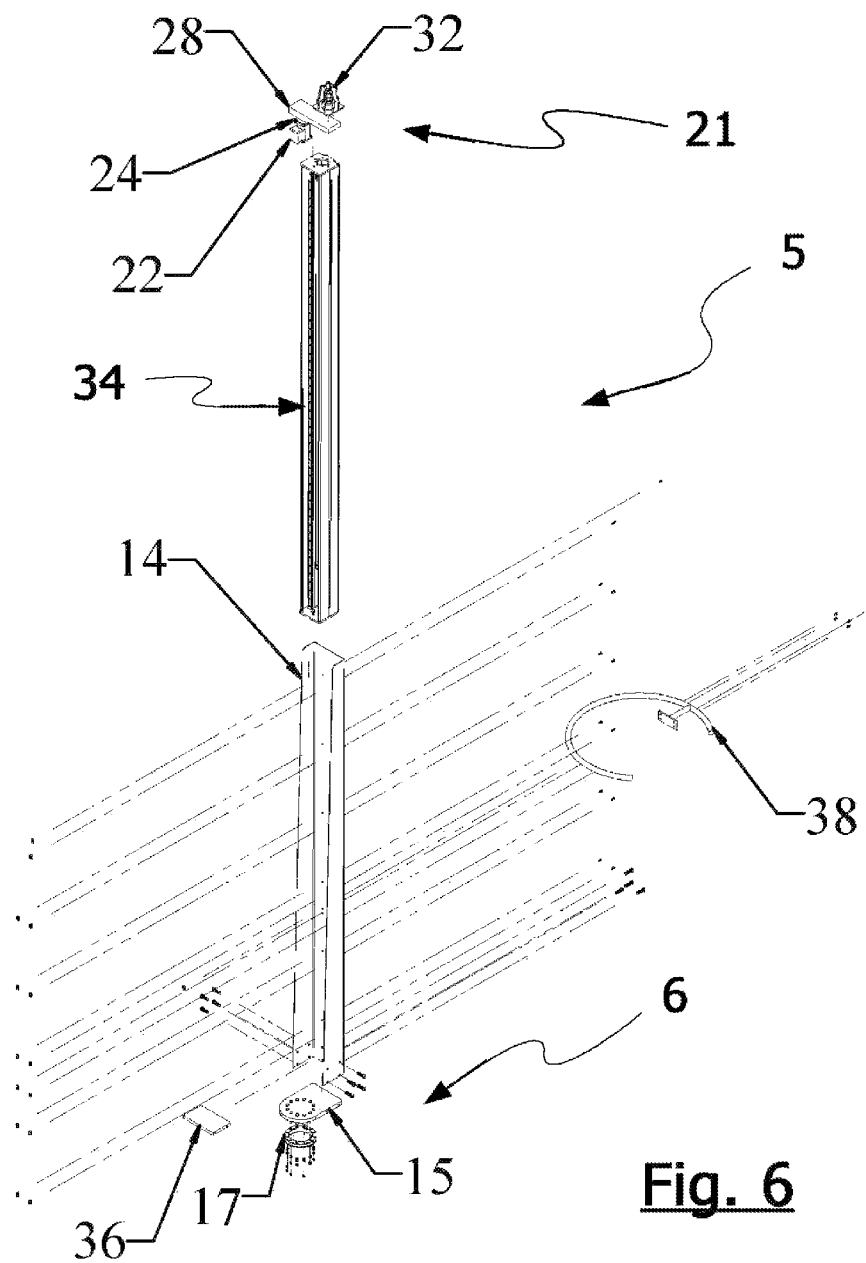
FIG. 6 presents a side elevated perspective exploded view of and exemplary column assembly.
Figure 6B:
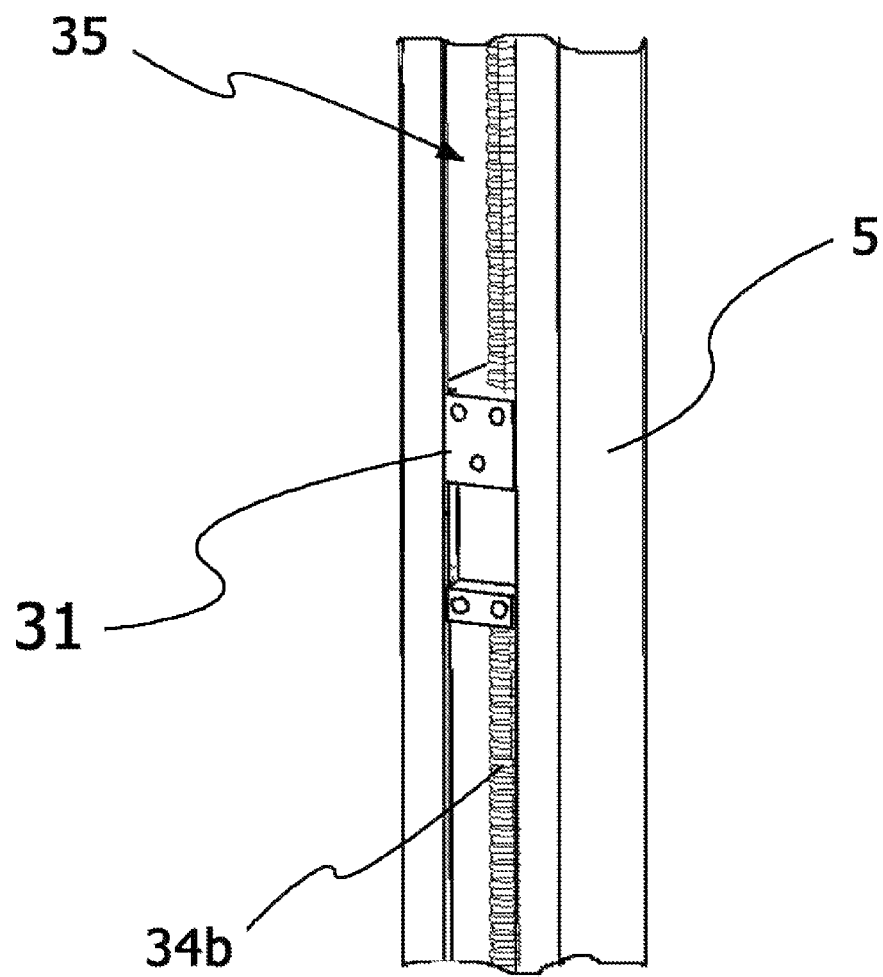
FIG. 6b presents a close-up perspective view of a portion of an exemplary column assembly.
Figure 7:
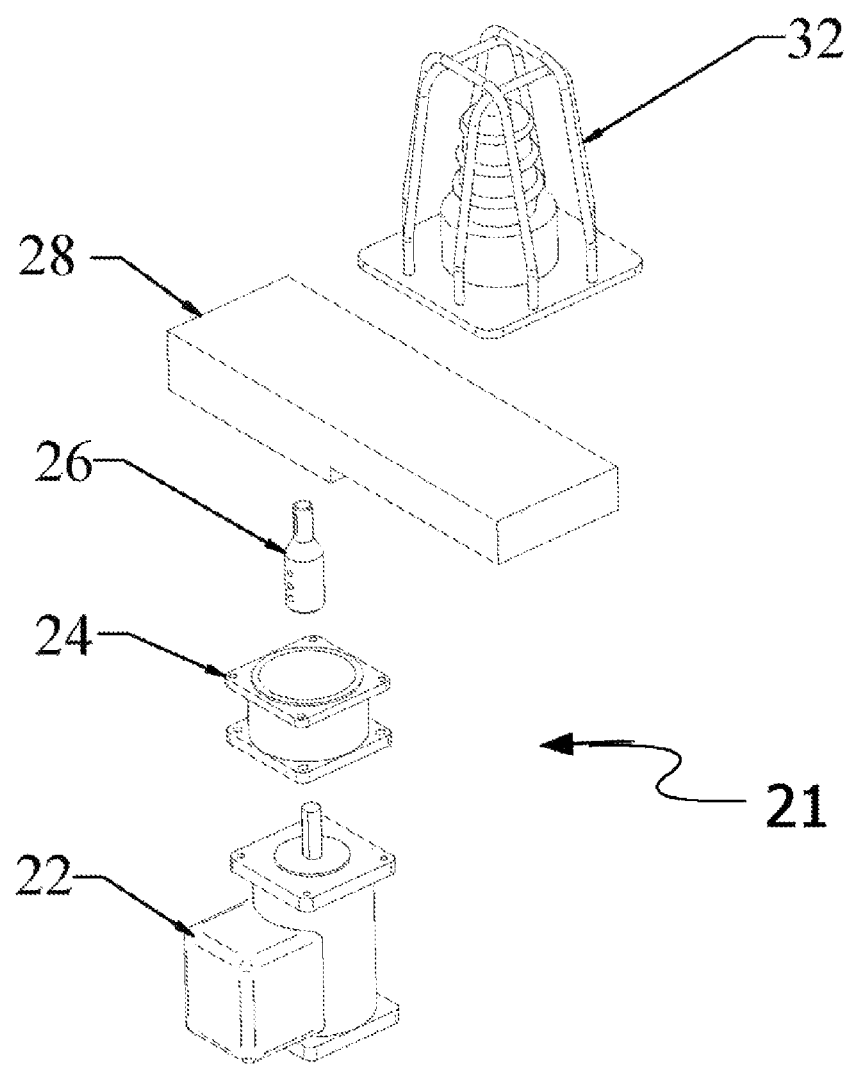
FIG. 7 presents an exploded view of one exemplary the top assembly.

Referring now to FIG. 6, one exemplary embodiment of a support column (5) is presented. As noted above, support column (5) defines a first end (5.1) and an opposing second end (5.2) wherein such first end is configured for being associated with column interface (6). As depicted in FIG. 6 and FIG. 6b, support column (5) defines a hollow/grooved housing comprising a vertical interface slot (35) configured for receiving moving column interface (31) and for providing access to the motion facilitator (34) as well as allowing linear movement of moving column interface (31). As best seen in FIG. 7, the top of support column (5) is mechanically associated with the motion facilitator assembly (21).

For the currently preferred embodiment, support column (5) is mechanically associated with column support (14) configured to supply additional stability. It should be appreciated that such column support (14) is optional. Additionally, a column rotating handle (38) may be mechanically associated with support column (5) to provide a method of manually rotating support column (5).

For the purposes of this document, a motion facilitator is simply a linear actuator configured for converting some kind of power, such as hydraulic or electric power, into linear motion. When a linear actuator is properly oriented, such linear motion is vertical motion. Examples of motion facilitators include power screws (e.g. lead (or machine) screws—which have sliding contact between the nut and screw—and ball screws—which operate on rolling contact), ropes, chains, pneumatic cylinders, and hydraulic cylinders.

For the currently preferred embodiment, motion facilitator (34) is a power screw. For the purposes of this document, power screws fall into two basic categories: lead screws (which have sliding contact between the nut and screw), and ball screws (which have a rolling contact between the nut and screw). One embodiment of a sliding contact nut assembly is a "speed nut." Speed nuts are typically cast in one piece with no moving parts and are commercially available in Plastic (acetal and PTFE—polytetrafluoroethylene) and bronz. Plastic nuts are preferably used with stainless steel screws while bronze nuts are preferably used with carbon steel screws. In contrast, ball screw assemblies use recirculating ball bearings that roll along the helical grooves in the screw and nut (as described later). Such a configuration minimizes or eliminates sliding friction.

For the presently preferred embodiment, motion facilitator (34) is ball screw (34b) based power screw. Such technology is disclosed in commonly known U.S. Pat. No. 7,914,017, issue on Mar. 29, 2011 to Setzer et al., the entire contents of which are herein incorporated by this reference for all purposes and for all that it discloses.

Referring now to FIG. 7, one exemplary embodiment of a column motion facilitator actuation assembly (21) is presented. Such assembly generates the force necessary to move the beam assembly (8) and associated components along the surface of support column (5). The top of support column (5) is mechanically associated with the motion facilitator actuation assembly (21) so that angular momentum generator (22) is in communication with motion facilitator (34). For the current embodiment, angular momentum generator (22) is a 24 V electric motor mechanically associated with gearing assembly (28) through a shaft adapter (26) and motor adapter (24). Optionally, a signaling device (32) may be mechanically and electrically associated to/through motion facilitator actuation assembly (21). One possible embodiment of a signaling device (32) is a caution light.

Figure 8:
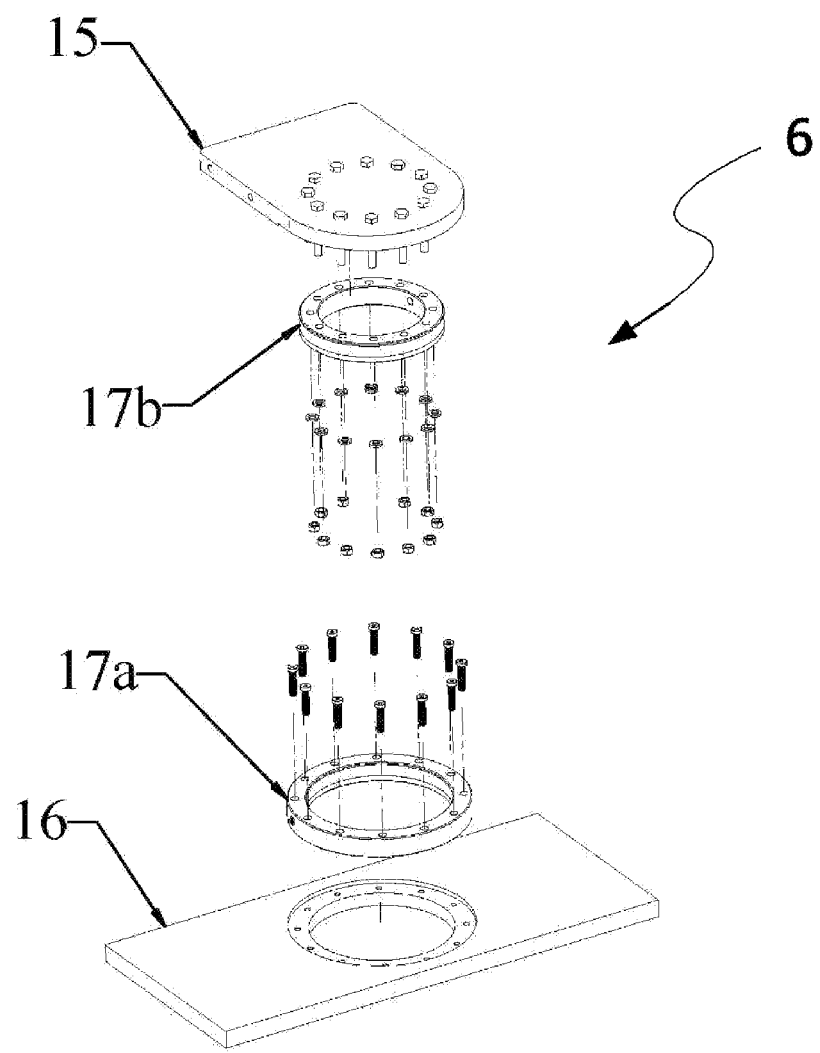
FIG. 8 presents an exploded view of one exemplary bottom assembly.

Referring now to FIG. 1a, FIG. 4, and FIG. 8, one exemplary embodiment of a column interface (6) is present. Column interface (6) comprises a column-transporter interface plate (16) configured for being mechanically associated with transporter interface (7) and rotatably associated with lower column interface (15). Column-transporter interface plate (16) is rotatably associated with lower column interface (15) via axis adjustment facilitator (17). For the presently preferred embodiment, axis adjustment facilitator (17) is a race bearing. For such embodiment, lower column interface (15) is mechanically associated with the first end of column support (5). Column interface (15) is further mechanically associated with column bearing inner race (17b) which is movably and mechanically associated with column bearing outer race (17a) which is further mechanically associated with column-transporter interface plate (16). One of ordinary skill in the art will appreciate that such a configuration allows column assembly (13) to be rotated relative to the transporter (11) apparatus.

Beam Assembly

The CCT (10) device comprises a beam assembly that may be configured in one of a plurality of possible configurations as required to perform a task. For the presently preferred embodiments, the beam assembly defines telescopic arm assembly (8) and the task to be performed is to remove one item from a plurality of items stacked on and being stored on an item interface (such as a pallet). A transporter (11) configured with a CCT (10) device may be used, for example, to the move a item interface (i.e. pallet) associated with items from a first location to a second location as well as lower/raise both the item interface and beam assembly (19). Similarly, telescopic arm assembly (8) may be extended (or not) to reach an item being stored on such item interface and with effector clamp (60) grasp such item and relocated such item to a new storage location (such as a shelf).

Figure 9A:
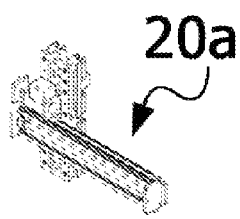
FIG. 9a presents a side perspective view of one exemplary embodiment of a beam assembly column.
Figure 9B:
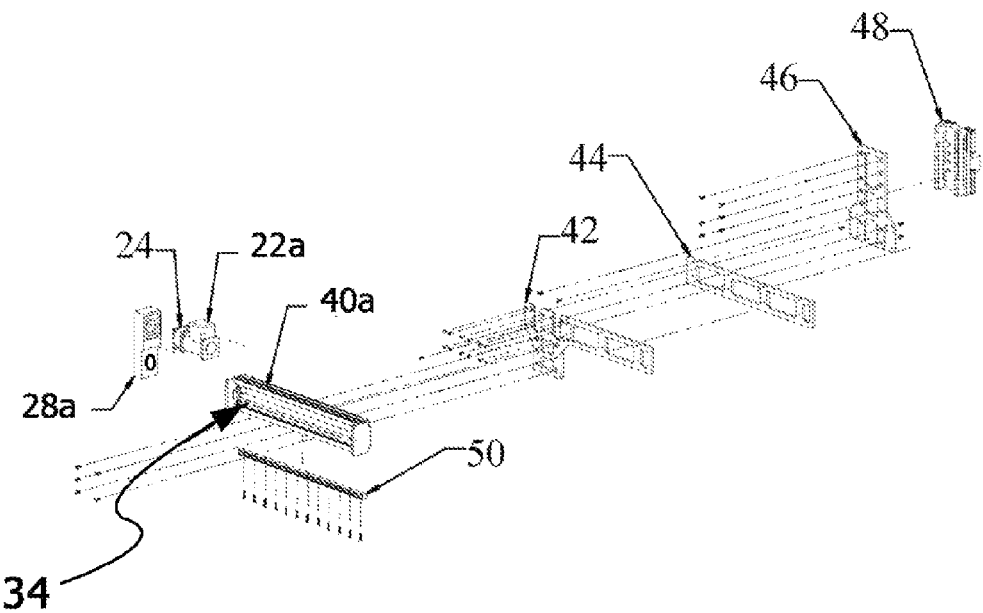

Referring now to FIG. 9a and FIG. 9b, one exemplary embodiment of a first beam assembly (20a) defining beam assembly effector (40a) is presented. Beam assembly effector (40a) houses a motion facilitator (34a) (which is a ball screw) wherein a first end of motion facilitator (34a) is mechanically associated with angular momentum generator (22a) via actuator gearing assembly (28a). As described above, for the current embodiment, angular momentum generator (22a) is a 24 V electric motor mechanically associated with the actuator gearing assembly (28a) through a shaft adapter and motor adapter (24) and is further mechanically associated with motion facilitator (34a) as described above. Consequently, when angler momentum generator (22a) is active and generating angular momentum (motion/rotation), motion facilitator (34a) will rotate and drive table (56, FIG. 10b) will move along beam assembly (20a).

A first side of drive table (48) is mechanically associated with upper mounting bracket (46) which is mechanically associated with lower mounting bracket (42) through spacer (44). Lower bracket (42) is mechanically associated with the motion facilitator housing for beam assembly effector (40a). A second side of drive table (48) is mechanically associated with moving column interface (31) thereby movably associating beam assembly (20b) with support column (5). Thus, the second side of drive table (48) preferably defines a table interface configured to move along support column (5).

For the current embodiment, column drive table (56, FIG. 10b) comprises a ball screw nut configured for receiving motion facilitator (34a) (which for this embodiment is a ball screw). It will be appreciated by one of ordinary skill in the art, that when motion facilitator (34a) is being activated by angular momentum generator (22a), column drive table (56) converts such angular momentum to linear movement along beam assembly (22a) (i.e. the ball screw nut (and associated components) moves along the ball screw depending on the direction of rotation).

Referring now to FIG. 10a and FIG. 10b, one exemplary embodiment of a second beam assembly (20b) is presented. For the current embodiment, many of the features and functions of second beam assembly (20b) are identical or substantially similar to first beam assembly (20a). As described above for first beam assembly (20a), second beam assembly (20b) comprises a beam assembly effector (40b) defining a housing for motion facilitator (34b) (which is a ball screw). One end of motion facilitator (34b) is mechanically associated with angular momentum generator (22b) via actuator gearing assembly (28b). As described above, for the current embodiment, angular momentum generator (22a) is a 24 V electric motor mechanically associated with the actuator gearing assembly (28a) through a shaft adapter and motor adapter (24) and is further mechanically associated with motion facilitator (34b) as describe above.

A first side of drive table (56) defines or is associated with a motion facilitator interface (such as a ball screw nut) configured for being associated with motion facilitator (34a) thereby defining a moving/sliding association between second beam assembly (20b) and first beam assembly (20a). A second side of drive table (56) is mechanically associated with a first side of mounting bracket (54). A second side of mounting bracket (54) if further mechanically associated with a motion facilitator housing defined by second beam assembly (20b). As noted above, drive table (56) comprises a ball screw nut configured to receive a motion facilitator (34a). Consequently, when angler momentum generator (22a) is active and generating angular momentum (motion/rotation), motion facilitator (34a) will rotate causing drive table (56) (and associated components) to move along motion facilitator (34a) thereby creating a moving/sliding association. It should be appreciated that other associations may be established including telescopic associations.

Figure 11:
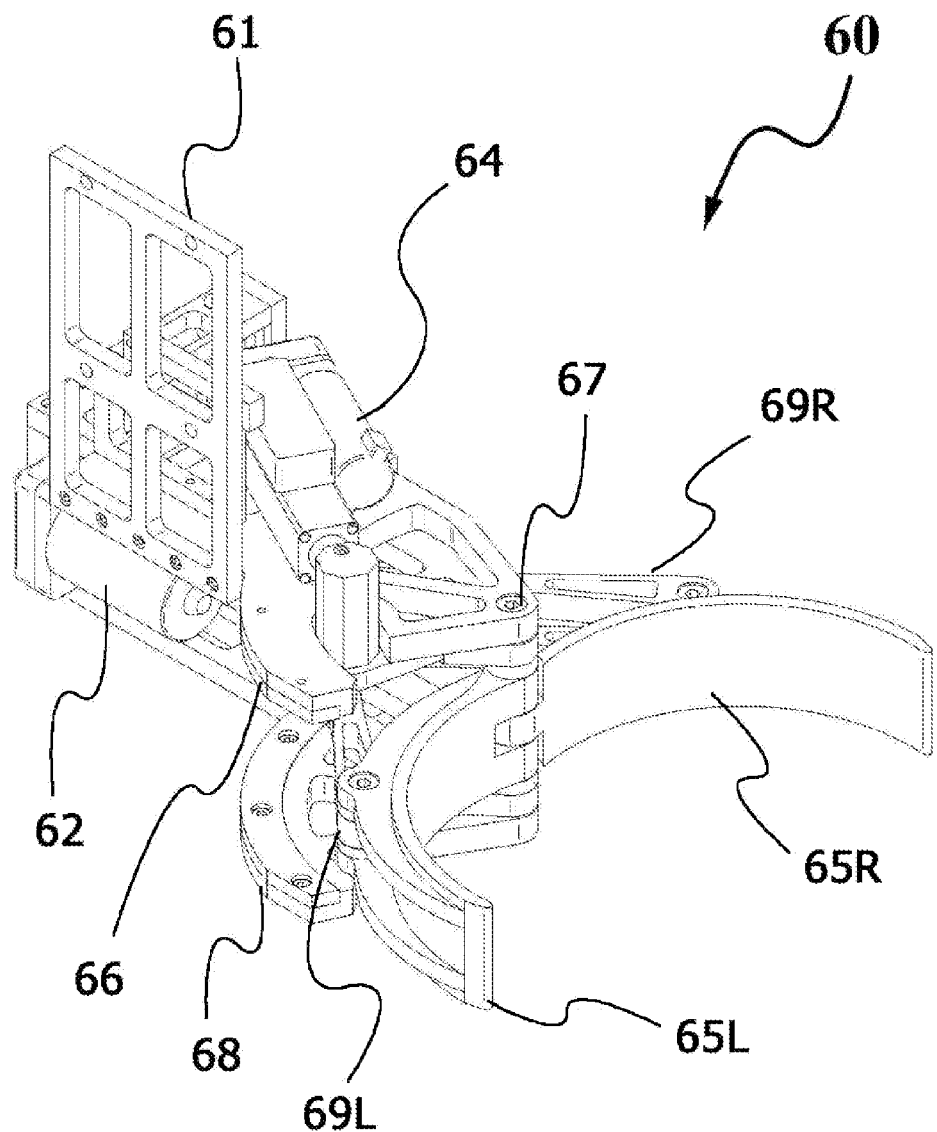
FIG. 11 presents one exemplary embodiment of an effector clamp assembly.

Referring now to FIG. 11, one exemplary embodiment of a column tool assembly is presented. It should be appreciated that for the preferred embodiment, second beam assembly effector (20b) defines a beam drive table interface configured for receiving at least one tool from a plurality of tools. For the current configuration, such tool is an effector clamp (60). The first side of such drive table interface comprises a ball screw nut configured to receive a motion facilitator (34b). Thus, when motion facilitator (34b) is activated, such beam drive table interface moves along motion facilitator (34b).

The beam drive table is further configured for being mechanically associated with tool interface (61). Tool interface (61) is mechanically associated with upper clamp brace (66) and lower clamp brace (68). Clamping members (65R) and (65L) are rotatably associated with upper clamp brace (66) and lower clamp brace (68) at pivot point (67) thereby allowing a grasping motion. Motion facilitator (62) is mechanically associated with clamp movers (69R) and (69L). When motion facilitator (62) moves in a first direction, clamp movers (69R) and (69L) will push against clamping members (65R) and (65L) causing a pinching motion. When motion facilitator (62) moves in a second direction, clamp movers (69R) and (69L) will pull against clamping members (65R) and (65L) causing a un-pinching motion. Motion facilitator (64) is configured to cause the clamping members to tilt.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A configurable column tool for transferring items, said configurable column tool comprising:
   a column assembly comprising a support column defining a first end and an opposing second end wherein said first end defines a column interface configured for being mechanically associated with a transporter interface defined by a transporter and wherein said second end is mechanically associated with a column motion facilitator assembly;
   at least one beam assembly mechanically associated with said column motion facilitator wherein at least one of said at least one beam assembly comprises a beam assembly effector comprising a beam motion facilitator, wherein one beam motion facilitator is mechanically associated with at least one tool attachment interface;
   at least one tool attachment mechanically associated with said at least one tool attachment interface;
   wherein said at least one beam assembly moves along said support column when said column motion facilitator is activated;
   wherein said tool attachment interface moves along a beam assembly when said beam motion facilitator is activated;
   wherein said tool attachment comprises a tool motion facilitator and wherein said tool attachment is configured to perform a function when said tool motion facilitator is activated; and
   a controller configured to selectively activate said column motion facilitator, said beam motion facilitator, and said tool motion facilitator.

2. A configurable column tool for transferring items as in claim 1, wherein said at least one tool attachment is a clasping device.

3. A configurable column tool for transferring items as in claim 1, wherein said column motion facilitator comprises a ball screw mechanically associated with an electric motor and wherein said beam motion facilitator comprises a ball screw mechanically associated with an electric motor and wherein said tool motion facilitator comprises an electric motor and wherein said controller is electrically associated with each of said electric motors.

4. A configurable column tool for transferring items as in claim 3, wherein each of said electric motors are 24 volt DC motors.

5. A configurable column tool for transferring items as in claim 3, wherein said tool motion facilitator comprises an electric motor mechanically associated with a first clamp mover mechanically associated with a first clamping member, said electric motor further mechanically associated with a second clamp mover mechanically associated with a second clamping member wherein a first end of said first clamping member is movably associated with a first end of said second clamping member thereby defining a pivot point.

6. A configurable column tool for transferring items as in claim 1, comprising a first beam assembly mechanically associated with said column motion facilitator and movably associated with a second beam assembly and wherein said second beam assembly is mechanically associated with said at least one tool attachment and wherein said first beam assembly defines a first beam assembly effector comprising a first beam motion facilitator and wherein said second beam assembly defines a second beam motion facilitator and wherein said second beam assembly moves along said first beam assembly when said first beam motion facilitator is activated and wherein said tool attachment moves along said second beam assembly when said second beam assembly motion facilitator is activated thereby defining a telescopic arm assembly.

7. A configurable column tool for transferring items as in claim 1, wherein said tool defines forks.

8. A configurable column tool for transferring items as in claim 1, wherein said tool defines slab extraction clamps.

9. A configurable column tool for transferring items as in claim 1, wherein said tool defines at least one hook.

10. A configurable column tool for transferring items from an item storage device associated with a transporter, said configurable column tool comprising:
- a column assembly comprising a support column defining a first column end and an opposing second column end wherein said first column end defines a column interface configured for being mechanically associated with a transporter interface defined by a transporter and wherein said column assembly extends vertically upward from said transporter interface to said second column end;
- a column motion facilitator assembly mechanically associated with said column assembly;
- a moving-column-interface movably associated with said column motion facilitator assembly wherein said moving-column-interface is configured to move along said support column when said column motion facilitator assembly is activated;
- a first beam assembly comprising a first beam assembly effector wherein said first beam assembly is mechanically associated with moving-column-interface and wherein said first beam assembly effector comprises a first beam assembly motion facilitator;
- a second beam assembly comprising a second beam assembly effector wherein said second beam assembly effector comprises a second beam assembly motion facilitator and wherein said second beam assembly is mechanically associated with said first beam assembly motion facilitator via a drive-table and wherein said drive-table is configured to move along said first beam assembly when said first beam assembly motion facilitator is activated;
- at least one tool assembly interface associated with said second beam assembly motion facilitator wherein said at least one tool assembly interface moves along said second beam assembly when said second beam assembly motion facilitator is activated;
- at least one tool assembly mechanically associated with said at least one tool assembly interface wherein said tool assembly comprises a first tool motion facilitator configured to activate said tool; and
- a controller configured to selectively activate at least one of (a) said column motion facilitator, (b) said first beam motion facilitator, (c) said second beam motion facilitator, and (d) said tool motion facilitator.

11. A configurable column tool for transferring items as in claim 10, wherein said at least one tool assembly defines a clamping device.

12. A configurable column tool for transferring items as in claim 10, wherein said column motion facilitator is mechanically associated with said second column end and wherein said column motion facilitator comprises a column motor mechanically associated with a gearing assembly wherein said gearing assembly is mechanically associated a column ball screw that runs along at least part of the length of said column assembly and wherein said moving-column-interface comprises a ball screw nut movably associated with said column ball screw so that said ball screw nut moves along said column ball screw when said column motor is activated.

13. A configurable column tool for transferring items as in claim 12, wherein:
- said first beam assembly motion facilitator is a first beam ball screw and wherein said first beam effector assembly comprises a first beam motor mechanically associated with a gearing assembly wherein said gearing assembly is mechanically associated with said first beam ball screw; and
- wherein said second beam assembly motion facilitator is a second beam ball screw and wherein said second beam effector assembly comprises a second beam motor mechanically associated with a gearing assembly wherein said gearing assembly is mechanically associated with said second beam ball screw.

14. A configurable column tool for transferring items as in claim 13, wherein said column motor, said first beam motor and said second beam motor are electric motors.

15. A configurable column tool for transferring items as in claim 13, wherein said first tool motion facilitator is an tool electric motor mechanically associated with a first clamp mover mechanically associated with a first clamping member, said tool electric motor further mechanically associated with a second clamp mover mechanically associated with a second clamping member wherein a first end of said first clamping member is movably associated with a first end of said second clamping member thereby defining a pivot point.

16. A configurable column tool for transferring items as in claim 15, wherein said tool assembly is one from the group of tool assemblies consisting of: (a) forks; (b) slab extraction clamps; and (c) at least one hook.

17. A configurable column tool for transferring items as in claim 15, further comprising a second tool motion facilitator configured to provide a tilt feature.

* * * * *